(12) United States Patent
Newmark et al.

(10) Patent No.: US 11,894,739 B2
(45) Date of Patent: Feb. 6, 2024

(54) FLUX MACHINE

(71) Applicant: ClearWater Holdings, Ltd., Carson City, NV (US)

(72) Inventors: G. Noah Newmark, Marina del Rey, CA (US); Stephen M. Collins, Westerville, OH (US); R. Morgan Harwith, Marina del Rey, CA (US)

(73) Assignee: CLEARWATER HOLDINGS, LTD., Carson City, NV (US)

( * ) Notice: Subject to any disclaimer, the term of this patent is extended or adjusted under 35 U.S.C. 154(b) by 458 days.

(21) Appl. No.: 15/327,608

(22) PCT Filed: Jul. 22, 2015

(86) PCT No.: PCT/US2015/041614
§ 371 (c)(1),
(2) Date: Jan. 19, 2017

(87) PCT Pub. No.: WO2016/014717
PCT Pub. Date: Jan. 28, 2016

(65) Prior Publication Data
US 2018/0219464 A1 Aug. 2, 2018

Related U.S. Application Data

(60) Provisional application No. 62/028,220, filed on Jul. 23, 2014, provisional application No. 62/028,235, filed on Jul. 23, 2014.

(51) Int. Cl.
*H02K 21/24* (2006.01)
*H02K 16/02* (2006.01)
(Continued)

(52) U.S. Cl.
CPC ............. *H02K 21/24* (2013.01); *H02K 16/02* (2013.01); *H02K 21/12* (2013.01); *H02K 51/00* (2013.01);
(Continued)

(58) Field of Classification Search
CPC .......... H02K 1/10; H02K 1/145; H02K 1/146; H02K 1/16; H02K 1/17; H02K 1/26;
(Continued)

(56) References Cited

U.S. PATENT DOCUMENTS 3,435,267 A  3/1969 Beyersdorf
4,185,366 A  1/1980 Gilbert
(Continued)

FOREIGN PATENT DOCUMENTS

CL  41.687  2/2017
CN  106233579 A  12/2016
(Continued)

OTHER PUBLICATIONS

International Search Report in International Application No. PCT/US2015/041614, dated Oct. 7, 2015 (2 pages).
(Continued)

*Primary Examiner* — Quyen P Leung
*Assistant Examiner* — Minki Chang
(74) *Attorney, Agent, or Firm* — NIXON PEABODY LLP

(57) ABSTRACT

A flux machine has plural coil assemblies and plural magnet sets arranged in mutual close proximity and circularly about a central axis. Either one of the coil assemblies and the magnet sets are supported by at least one axle which is aligned with the central axis, and either one of the coil assemblies and magnet sets executes rotary motion about the central axis when electrical current is present in the coil assemblies. Magnetic flux of the magnet sets is directed axially and radially while machine rotation is orthogonal to
(Continued)

the direction of flux. A plurality of magnets in each magnet set are supported by one or another of a plurality of coaxially aligned axles so that the flux machine may operate as an electrical motor, as an electrical generator, or both at the same time.

18 Claims, 9 Drawing Sheets

(51) Int. Cl.
| | |
|---|---|
| H02K 51/00 | (2006.01) |
| H02K 21/12 | (2006.01) |
| H02K 21/22 | (2006.01) |
| H02K 21/14 | (2006.01) |
| H02K 1/14 | (2006.01) |
| H02K 7/02 | (2006.01) |

(52) U.S. Cl.
CPC .............. *H02K 1/148* (2013.01); *H02K 7/02* (2013.01); *H02K 21/14* (2013.01); *H02K 21/22* (2013.01); *H02K 2201/12* (2013.01); *Y02E 10/72* (2013.01)

(58) Field of Classification Search
CPC .. H02K 1/27; H02K 3/04; H02K 3/12; H02K 2201/12
USPC ... 310/74, 113, 114, 154.01, 156.02, 156.07, 310/156.08–156.31, 266, 267
See application file for complete search history.

(56) References Cited

U.S. PATENT DOCUMENTS

| | | | |
|---|---|---|---|
| 4,286,198 A | 8/1981 | de Valroger | |
| 4,370,577 A | 1/1983 | Wakabayashi | |
| 4,441,043 A | 4/1984 | DeCesare | |
| 4,458,228 A | 7/1984 | Baumgartner | |
| 4,542,323 A | 9/1985 | Doemen | |
| 4,563,602 A | 1/1986 | Nagasaka | |
| 4,568,862 A | 2/1986 | Tassinario | |
| 4,626,751 A | 12/1986 | Doemen | |
| 4,802,690 A | 2/1989 | Raidel | |
| 4,806,832 A | 2/1989 | Muller | |
| 4,924,156 A | 5/1990 | Muller | |
| 5,038,083 A | 8/1991 | Muller | |
| 5,128,570 A | 7/1992 | Isozaki | |
| 5,130,583 A | 7/1992 | Andoh | |
| 5,134,682 A | 7/1992 | Muller | |
| 5,142,181 A | 8/1992 | Newell | |
| 5,474,799 A | 12/1995 | Thigpen | |
| 5,708,310 A | 1/1998 | Sakamoto | |
| 5,801,497 A | 9/1998 | Shamoto | |
| 5,838,079 A | 11/1998 | Morohashi | |
| 5,894,902 A | 4/1999 | Cho | |
| 5,952,743 A | 9/1999 | Sidey | |
| 5,977,684 A | 11/1999 | Lin | |
| 6,011,339 A | 1/2000 | Kawakami | |
| 6,222,287 B1 | 4/2001 | Suzuki | |
| 6,228,220 B1 | 5/2001 | Hada | |
| 6,228,235 B1 | 5/2001 | Tepman | |
| 6,414,408 B1 | 7/2002 | Erdman | |
| 6,710,581 B1 | 3/2004 | Lee | |
| 6,798,089 B1 | 9/2004 | Smit | |
| 6,803,691 B2 | 10/2004 | Rose | |
| 6,870,284 B2 | 3/2005 | Uchida | |
| 6,924,574 B2 | 8/2005 | Qu | |
| 7,067,942 B2 | 6/2006 | Korenaga | |
| 7,633,198 B2 | 12/2009 | Kirkman | |
| 7,652,406 B2 | 1/2010 | Kim | |
| 7,701,678 B2 | 4/2010 | Dooley | |
| 7,755,244 B2 | 7/2010 | Ley | |
| 7,777,381 B2 | 8/2010 | Takeuchi | |
| 7,791,245 B1 | 9/2010 | Hao | |
| 7,812,500 B1 | 10/2010 | Ham | |
| 7,884,563 B2 | 2/2011 | Takeuchi | |
| 7,906,885 B2 | 3/2011 | Lu | |
| 7,944,107 B2 | 5/2011 | Thoms | |
| 7,944,112 B2 | 5/2011 | Kim | |
| 7,960,893 B2 | 6/2011 | Kim | |
| 7,986,069 B2 | 7/2011 | Takeuchi | |
| 7,990,019 B2 | 8/2011 | Sung | |
| 8,053,946 B2 | 11/2011 | Koizumi | |
| 8,058,763 B2 | 11/2011 | Clark | |
| 8,074,922 B2 | 12/2011 | Bojiuc | |
| 8,084,879 B2 | 12/2011 | Stiesdal | |
| 8,089,175 B2 | 1/2012 | Stiesdal | |
| 8,106,563 B2 | 1/2012 | Ritchey | |
| 8,110,961 B2 | 2/2012 | Hsu | |
| 8,115,361 B2 | 2/2012 | Iki | |
| 8,154,146 B2 | 4/2012 | Fischer | |
| 8,159,104 B1 | 4/2012 | Bojiuc | |
| 8,169,109 B2 | 5/2012 | Sykes | |
| 8,188,633 B2 | 5/2012 | Quere | |
| 8,207,644 B2 | 6/2012 | Himmelmann | |
| 8,207,648 B2 | 6/2012 | Li | |
| 8,212,445 B2 | 7/2012 | Ritchey | |
| 8,232,695 B2 | 7/2012 | Bojiuc | |
| 8,258,782 B2 | 9/2012 | Kaita | |
| 8,264,120 B2 | 9/2012 | Hsu | |
| 8,274,191 B2 | 9/2012 | Stiesdal | |
| 8,278,872 B2 | 10/2012 | Li | |
| 8,283,813 B2 | 10/2012 | Gilchrist | |
| 8,288,916 B2 | 10/2012 | Quere | |
| 8,294,322 B2 | 10/2012 | Aiki | |
| 8,299,676 B2 | 10/2012 | Miyata | |
| 8,330,404 B2 | 12/2012 | Sakai | |
| 8,334,634 B2 | 12/2012 | Palmer | |
| 8,339,009 B2 | 12/2012 | Mueller | |
| 8,344,567 B2 | 1/2013 | Kamiki | |
| 8,350,442 B2 | 1/2013 | Akutsu | |
| 8,354,768 B2 | 1/2013 | Cipriani | |
| 8,358,046 B2 | 1/2013 | Platon | |
| 8,373,319 B1 | 2/2013 | Barnes | |
| 8,381,389 B2 | 2/2013 | Lisi | |
| 8,390,168 B2 | 3/2013 | Hsu | |
| 8,432,081 B2 | 4/2013 | Wang | |
| 8,436,507 B2 | 5/2013 | Chien | |
| 8,482,171 B2 | 7/2013 | Edwards | |
| 8,536,751 B2 | 9/2013 | Cipriani | |
| 8,536,758 B2 | 9/2013 | Lisi | |
| 8,546,988 B2 | 10/2013 | Bright | |
| 9,729,016 B1 * | 8/2017 | Hunstable | H02K 21/24 |
| 2002/0130655 A1 | 9/2002 | Okada | |
| 2003/0011455 A1 | 1/2003 | Wakuda | |
| 2003/0025417 A1 | 2/2003 | Rose | |
| 2003/0102770 A1 | 6/2003 | Laskaris | |
| 2003/0127917 A1 | 7/2003 | Kang | |
| 2003/0230946 A1 | 12/2003 | Durham | |
| 2004/0000613 A1 | 4/2004 | Rose | |
| 2004/0239199 A1 | 12/2004 | Qu | |
| 2005/0104456 A1 | 5/2005 | Yajima | |
| 2005/0179336 A1 | 8/2005 | Hasebe | |
| 2006/0022544 A1 | 2/2006 | Kinashi | |
| 2006/0038456 A1 | 2/2006 | Bojiuc | |
| 2006/0043821 A1 | 3/2006 | Kojima | |
| 2007/0228860 A1 | 10/2007 | Rao | |
| 2007/0247017 A1 | 10/2007 | Bumby | |
| 2008/0048505 A1 | 2/2008 | Moriyama | |
| 2008/0122311 A1 | 5/2008 | Werst | |
| 2008/0278020 A1 | 11/2008 | Ley | |
| 2009/0224628 A1 | 9/2009 | Hiwaki | |
| 2010/0058817 A1 | 3/2010 | Yoshikawa | |
| 2010/0072959 A1 | 3/2010 | Dooley | |
| 2010/0101879 A1 | 4/2010 | McVickers | |
| 2011/0058967 A1 | 3/2011 | Arita | |
| 2011/0109190 A1 | 5/2011 | Aoyama | |
| 2011/0234033 A1 | 9/2011 | Filatov | |
| 2012/0228977 A1 | 9/2012 | Petro | |
| 2012/0299405 A1 | 11/2012 | Li | |
| 2012/0299430 A1 | 11/2012 | Pennander | |
| 2012/0306212 A1 | 12/2012 | Munoz | |

(56) References Cited

U.S. PATENT DOCUMENTS

| | | | |
|---|---|---|---|
| 2013/0270955 A1 | 10/2013 | Lillington | |
| 2014/0191612 A1 | 7/2014 | Mariotto | |
| 2015/0171694 A1* | 6/2015 | Walsh | H02K 3/47 |
| | | | 310/156.43 |

FOREIGN PATENT DOCUMENTS

| | | |
|---|---|---|
| DE | 3142913 A1 | 5/1983 |
| EP | 2168225 A4 | 6/2015 |
| IN | 201627027705 A | 10/2016 |
| JP | S48-6323 A | 1/1973 |
| JP | S49-34082 | 9/1974 |
| JP | S 54-141307 U | 10/1979 |
| JP | S455-160964 | 12/1980 |
| JP | H04-359656 A | 12/1992 |
| JP | 1994-005380 | 1/1994 |
| JP | H10-23721 A | 1/1998 |
| JP | 2000-134902 A | 5/2000 |
| JP | 2001-103717 A | 4/2001 |
| JP | 2001-211623 A | 8/2001 |
| JP | 2001-275396 A | 10/2001 |
| JP | 2001-359261 A | 12/2001 |
| JP | 2005/287103 A | 10/2005 |
| JP | 2006-280066 A | 10/2006 |
| JP | 2006-529081 A | 12/2006 |
| JP | 2007-153114 A | 6/2007 |
| JP | WO 2008-126408 A | 6/2008 |
| JP | 2009-505619 A | 2/2009 |
| JP | 2009-136046 A | 6/2009 |
| JP | 2010-166741 A | 7/2010 |
| JP | 2011-101545 A | 5/2011 |
| JP | 2012-075318 A | 4/2012 |
| JP | 2012-166738 A | 9/2012 |
| JP | 2012-222843 A | 11/2012 |
| JP | 2012-222974 A | 11/2012 |
| JP | 5117813 B2 | 1/2013 |
| JP | WO 2012-007984 A1 | 9/2013 |
| JP | 2014-107904 A | 6/2014 |
| JP | 5515297 B2 | 11/2014 |
| KR | 16-130755 | 11/2016 |
| RU | 2 131 637 C1 | 10/1999 |
| RU | 2310966 C1 | 11/2007 |
| RU | 2393621 C1 | 6/2010 |
| TW | 200919903 S | 5/2009 |
| TW | 201444231 A | 11/2014 |
| TW | 201618438 | 5/2016 |
| WO | WO 91/07805 | 5/1991 |
| WO | WO 93/15547 A1 | 8/1993 |
| WO | WO 03/065554 A1 | 8/2003 |
| WO | WO 03/094328 A1 | 11/2003 |
| WO | WO 2007/021310 A2 | 2/2007 |
| WO | WO 2009/009075 A1 | 1/2009 |
| WO | WO 2015/122190 A1 | 8/2015 |
| WO | WO 2016/014717 A1 | 1/2016 |

OTHER PUBLICATIONS

Extended European Search Report in European Patent Application No. 15825207.2, dated Dec. 14, 2017 (9 pages).
Communication pursuant to Article 94(3) EPC in European Application No. 15825207.2-1201, dated Nov. 22, 2018 (8 pages).
European Examination Report in European Patent Application No. EP 15825207.2, dated Feb. 8, 2021 (9 pages).

* cited by examiner

FLUX MACHINE

CROSS-REFERENCE TO RELATED APPLICATIONS

This application is a National Phase of International Application No. PCT/US2015/041614, filed Jul. 22, 2015, which designated the U.S. and that International Application was published under PCT Article 21(2) in English, which claims priority under 35 U.S.C. § 119(e) to U.S. Provisional Application Nos. 62/028,220, filed Jul. 23, 2014, and 62/028,235, filed Jul. 23, 2014, the contents all of which are hereby incorporated herein by reference in their entirety.

TECHNICAL FIELD

This disclosure relates to rotating electromagnetic motors and generators.

BACKGROUND ART

Magnet transverse flux machines conduct magnetic flux perpendicular (transverse) to the current in the coil and can produce higher torque density than standard brushless machines with longitudinal flux. Such machines have high power density and can be used both as motors and generators. Torque increases with the number of poles at a constant stator current. Due to the high number of poles in a transverse flux machines, the frequency of electric current in stator windings is high while shaft speed is low. Such machines have a three dimensional magnetic circuit which has traditionally made fabrication and assembly of stator and rotor components difficult. Prior art methods of manufacturing the magnetic circuits require the formation of individual U-shaped magnetic circuits. For example, a U-shaped magnetic circuit may be comprised of a plurality of individual U-shaped laminations stacked together. Assembly of such machines then requires the correct placement, alignment and spacing of each U-shaped magnetic circuit. Another method known in the prior art is to construct two 3D stacks, each having one half of every magnetic circuit as a series of L-shaped protrusions. When joined together around the coil, the magnetic circuits are completed in the U-shape. This method requires the construction of a stack with a complex three-dimensional shape and requires precise rotational alignment of the stacks to properly form the magnetic circuit. The present flux machine described herein is simple to manufacture and assemble, is compact and has other novel and highly beneficial aspects. The prior art relevant to the present disclosure is included in the following table and incorporated herein by reference:

| Cited Patent | Filing date | Publication date | Applicant | Title |
| --- | --- | --- | --- | --- |
| U.S. Pat. No. 4,973,868 | Jul. 28, 1989 | Nov. 27, 1990 | J. M. Voith Gmbh | Electrical machine with permanent magnet excitation |
| U.S. Pat. No. 5,051,641 | Feb. 5, 1988 | Sep. 24, 1991 | J. M. Voith Gmbh | Transversal flow machine in accumulator arrangement |
| U.S. Pat. No. 5,117,142 | Jan. 30, 1991 | May 26, 1992 | 501 Ibk Ab | Permanent magnetized synchronous machine designed according to the transverse flux principle |
| U.S. Pat. No. 5,289,072 | Oct. 15, 1991 | Feb. 22, 1994 | J. M. Voith Gmbh | Electrical machine |
| U.S. Pat. No. 5,543,674 | Jun. 28, 1991 | Aug. 6, 1996 | Radio Energie | Dynamoelectric machine composed of sectors having transverse fluxes |
| U.S. Pat. No. 5,777,418 | Jun. 17, 1996 | Jul. 7, 1998 | Voith Turbo Gmbh | Transverse flux motor with magnetic floor gap |
| U.S. Pat. No. 5,942,828 | Jun. 23, 1997 | Aug. 24, 1999 | Hill; Wolfgang | Transverse flux machine |
| U.S. Pat. No. 5,973,436 | Jul. 30, 1997 | Oct. 26, 1999 | Rolls-Royce Power Engineering Plc | Electrical machine |
| U.S. Pat. No. 6,043,579 | Jan. 6, 1998 | Mar. 28, 2000 | Hill; Wolfgang | Permanently excited transverse flux machine |
| U.S. Pat. No. 6,492,758 | Nov. 1, 2000 | Dec. 10, 2002 | Fisher & Paykel Limited | Polyphase transverse flux motor |
| U.S. Pat. No. 6,700,267 | Jan. 75, 2002 | Mar. 2, 2004 | Deere & Company | Transverse flux drive |
| U.S. Pat. No. 6,729,140 | Jan. 30, 2002 | May 4, 2004 | Rolls-Royce Plc | Electrical machine |
| U.S. Pat. No. 6,741,010 | Jan. 8, 2001 | May 25, 2004 | Rolls Royce Plc | Rotor disc assembly having rotor rim with alternate magnets and laminated pole pieces |

-continued

| Cited Patent | Filing date | Publication date | Applicant | Title |
|---|---|---|---|---|
| U.S. Pat. No. 6,847,135 | Dec. 11, 2002 | Jan. 25, 2005 | Robert Bosch Gmbh | Unipolar transverse flux machine |
| U.S. Pat. No. 6,888,272 | Aug. 1, 2002 | May 3, 2005 | Robert Bosch Gmbh | Unipolar transverse magnetic flux machine |
| U.S. Pat. No. 6,952,068* | Dec. 18, 2000 | Oct. 4, 2005 | Otis Elevator Company | Fabricated components of transverse flux electric motors |
| U.S. Pat. No. 7,030,529 | Jan. 29, 2003 | Apr. 18, 2006 | Robert Bosch Gmbh | Electrical machines, especially engines excited by permanent magnets |
| U.S. Pat. No. 7,124,495 | May 31, 2005 | Oct. 24, 2006 | Otis Elevator Company | Method for making an electric motor |
| U.S. Pat. No. 7,164,220* | May 12, 2005 | Jan. 16, 2007 | Rolls-Royce Plc | Stator pole structure for an electrical machine |
| U.S. Pat. No. 7,312,549 | May 8, 2002 | Dec. 25, 2007 | Aalborg Universitet | Transverse flux machine with stator made of e-shaped laminates |
| U.S. Pat. No. 7,466,058 | Jun. 28, 2006 | Dec. 16, 2008 | Eocycle Technologies, Inc. | Transverse flux electrical machine with segmented core stator |
| U.S. Pat. No. 7,492,074 | Mar. 30, 2007 | Feb. 17, 2009 | Norman Rittenhouse | High-efficiency wheel-motor utilizing molded magnetic, flux channels with transverse-flux stator |
| U.S. Pat. No. 7,579,742 | Jan. 17, 2008 | Aug. 25, 2009 | Norman Rittenhouse | High-efficiency parallel-pole molded-magnetic flux channels transverse wound motor-dynamo |
| US20010008356 | Jan. 8, 2001 | Jul. 19, 2001 | Wilkin Geoffrey A | Rotor disc |
| US20040155548 | May 8, 2002 | Aug. 12, 2004 | Rasmussen Peter Omand | Transverse flux machine with stator made of c-shaped laminates |
| US20040251759 | Jun. 9, 2004 | Dec. 16, 2004 | Hirzel Andrew D. | Radial airgap. transverse flux motor |
| US20060192453 | May 27, 2003 | Aug. 31, 2006 | Gieras Jacek F | Modular transverse flux motor with integrated brake |
| US20070216249 | Apr. 28, 2006 | Sep. 20, 2007 | Mtu Aero Engines Gmbh | Transverse flux machine and turbine-type machine having such a transverse flux machine |
| US20070267929 | May 11, 2007 | Nov. 22, 2007 | Minebea Co., Ltd. | Stator arrangement and rotor arrangement for a transverse flux machine |
| US20080136272 | Dec. 5, 2007 | Jun. 12, 2008 | Toshio Ishikawa | Rotating electrical machine |
| US20080211326 | Dec. 28, 2007 | Sep. 4, 2008 | Korea Electro Technology Research Institute | Inner rotor type permanent magnet excited transverse flux motor |
| US20080246362 | May 21, 2008 | Oct. 9, 2008 | Hirzel Andrew D | Radial airgap. transverse flux machine |
| US20090026869 | Jul. 16, 2008 | Jan. 29, 2009 | Christian Kaehler | Transverse flux reluctance machine and method for manufacturing same |
| US20090108712 | Jul. 25, 2008 | Apr. 30, 2009 | Holtzapple Mark T | Short-flux path motors/generators |

-continued

| Cited Patent | Filing date | Publication date | Applicant | Title |
| --- | --- | --- | --- | --- |
| DE10037787A1 | Aug. 3, 2000 | Mar. 14, 2002 | Landert Motoren Ag | Permanent magnet excited synchronous machine e.g. general purpose drive motors, has external rotor design with external rotor joined rotationally-rigldly to rotatable shaft, around common axis |
| WO2006117210A1 | May 4, 2006 | Nov. 9, 2006 | Bosch Rexroth Ag | Phase module for a transverse flux motor |
| WO2007000054A1 | Jun. 26, 2006 | Jan. 4, 2007 | Maxime R Dubois | Transverse flux electrical machine with segmented core stator |
| WO2009070333A1 | Nov. 28, 2008 | Jun. 4, 2009 | Norman P Rittenhouse | Wind turbine generator |

DISCLOSURE OF INVENTION

The drawings illustrate a novel electromagnetic rotating flux machine 10 having manufacturing and operational advantages with respect to the prior art. For example, flux density is relatively high, and the pole number may be increased without reducing magnetomotive force per pole, enabling higher power densities. Further advantages include a large number of poles with relatively short current pathways enabling efficiency gains due to a high torque/weight ratio, a high power/weight ratio and relatively low copper losses.

An arrangement of coils and magnets has been developed with magnetic flux directed from four or more directions coupled into coil assemblies. For instance, there may be two magnets that are oriented with poles facing for directing magnetic flux in a radial direction from opposite sides of the coils, and two additional magnets that are oriented with poles facing axially, to direct flux axially from opposite sides of the coils. Additionally, the coils may be oriented so that the windings and current within those windings flows in a plane that is perpendicular to a vector pointing in an established circumferential direction of motion of a rotor of the flux machine.

Thus, the magnets may be adjacent to different sides of the coils but and all magnetic flux circuits combine additively.

With the magnets (electromagnets or permanent magnets, or a combination of the two) mounted on independent rotors and axels as described herein, they may be operated independently at different frequencies and/or as a motor and generator independently and simultaneously. These innovations are possible given the orientation of the coils that sit in a plane that is perpendicular to the rotational axis of the machine. Rotation causes a relative motion between magnets and coils with the magnets and coils close coupled with a minimum air gap therebetween.

BRIEF DESCRIPTION OF DRAWINGS

Embodiments of the described machine are illustrated by way of example in the figures of the accompanying drawing sheets, in which like references indicate similar elements and in which.

BEST MODES FOR CARRYING OUT THE INVENTION

Figure 1:
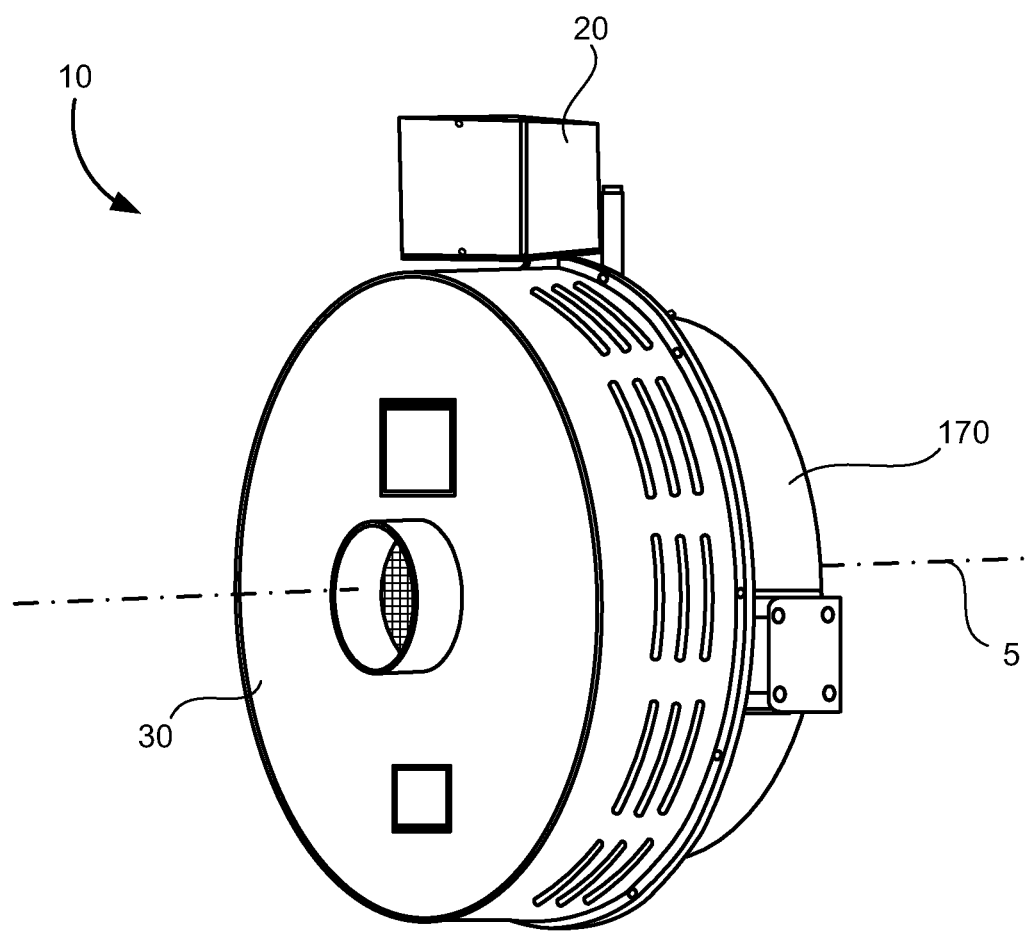
FIG. 1 is a perspective view of a flux machine according to the following detailed description.

FIG. 1 shows that machine 10 may be generally circular in shape and relatively short axially between shroud 30 and flywheel housing 170 providing space and weight savings. Electrical connections to machine 10 may be made via a standard connection box 20 and mechanical engagement may be made via one or more coaxial shafts aligned with central axis 5 as shown in the FIGS. 6-9.

Figure 2:
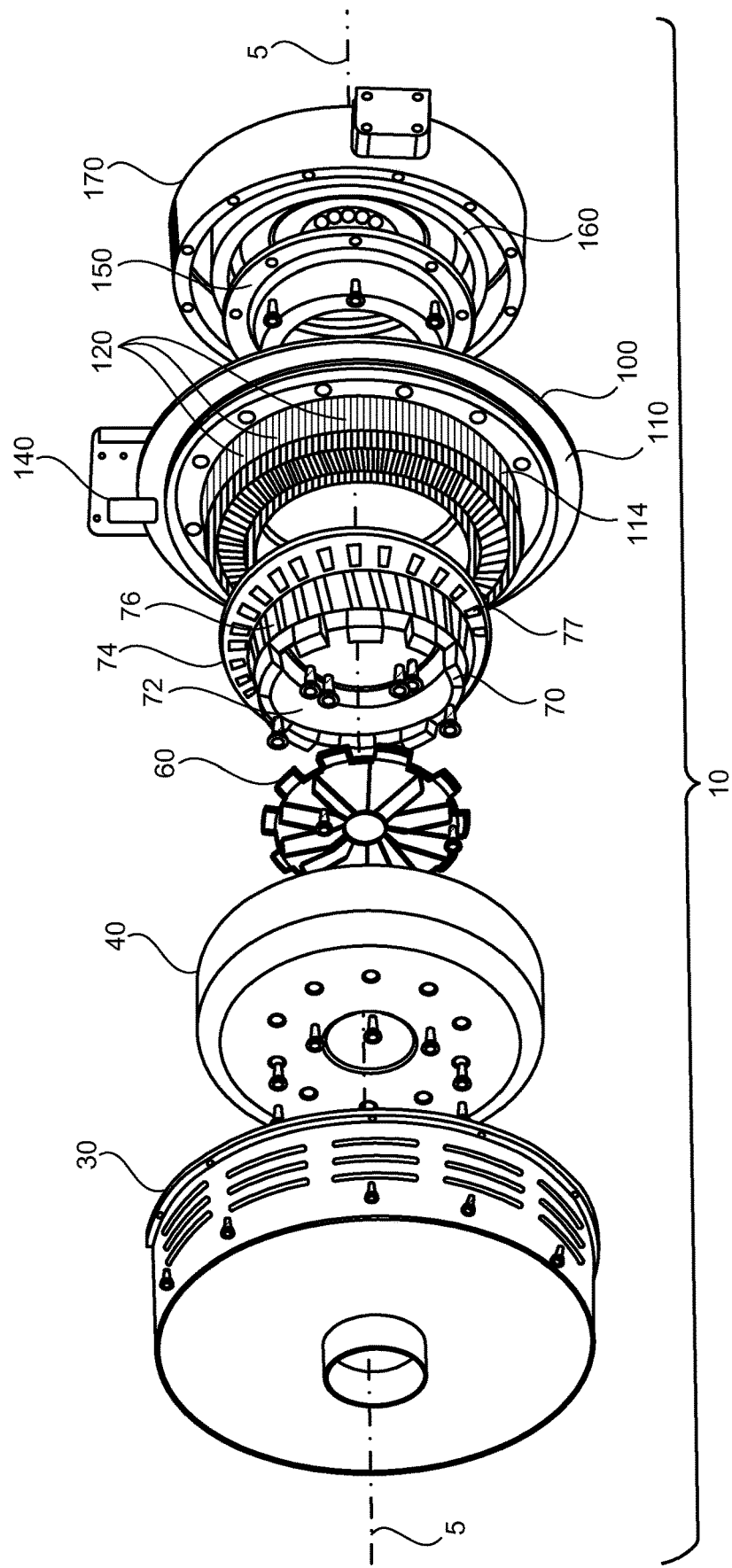
FIG. 2 is a perspective expanded view thereof.

FIG. 2 illustrates several components and sub-assemblies of machine 10 according to embodiments, showing their relative axial positions. Moving from left to right in FIG. 2, shown are: shroud 30, outer rotor-magnet assembly 40, fan 60, inner rotor-magnet assembly 70, stator assembly 100 with coil assemblies 120, rotor hub 150, flywheel 160, and flywheel housing 170. These components are aligned about common axis 5 which is also the center of rotation of machine 10. In embodiments, outer rotor-magnet assembly 40, fan 60, inner rotor-magnet assembly 70, rotor hub 150, and flywheel 160 may be mutually joined mechanically and therefore may rotate together. In other embodiments some of these elements and other elements may be adapted for independent rotation about coaxial shafts as will be discussed and shown. In embodiments shroud 30, stator assembly 100 and flywheel housing 170 may not rotate, may be mutually mechanically joined, and may be fixed in place as a stator. In other embodiments stator assembly 100 may be mounted for rotation about a central axle with each of the winding phases connected via a standard rotary electrical interface, such as those commonly found in slip ring motors. Assembly 100 would therefore function as the rotor of machine 10 while outer rotor-magnet assembly 40 and inner rotor-magnet assembly 70 may function as the stator of machine 10. Those of skill would understand how to make this simple adaptation.

Figure 3:
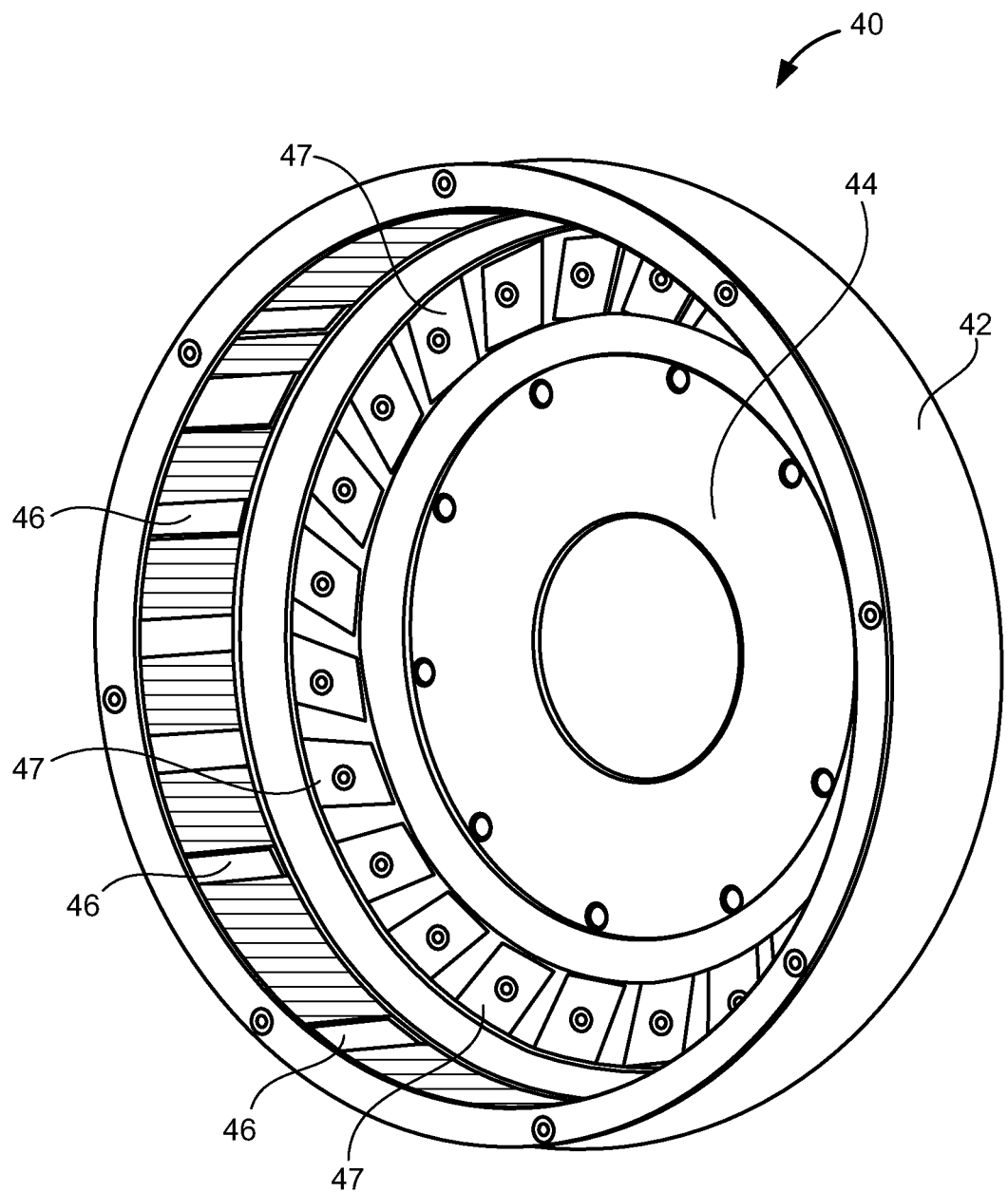
FIG. 3 is a perspective view of an outer rotor-magnet assembly of an embodiment thereof.

As exemplified in FIG. 3 the sets of axially aligned magnets 46 and radially aligned magnets 47 may be held in circular fixed positions as part of an outer rotor assembly 40 attached to a single axle. Alternately, magnets 46, 47 may be secured to one or more axially aligned axles by distinct mechanical frames as shown in FIGS. 6-9.

Figure 4:
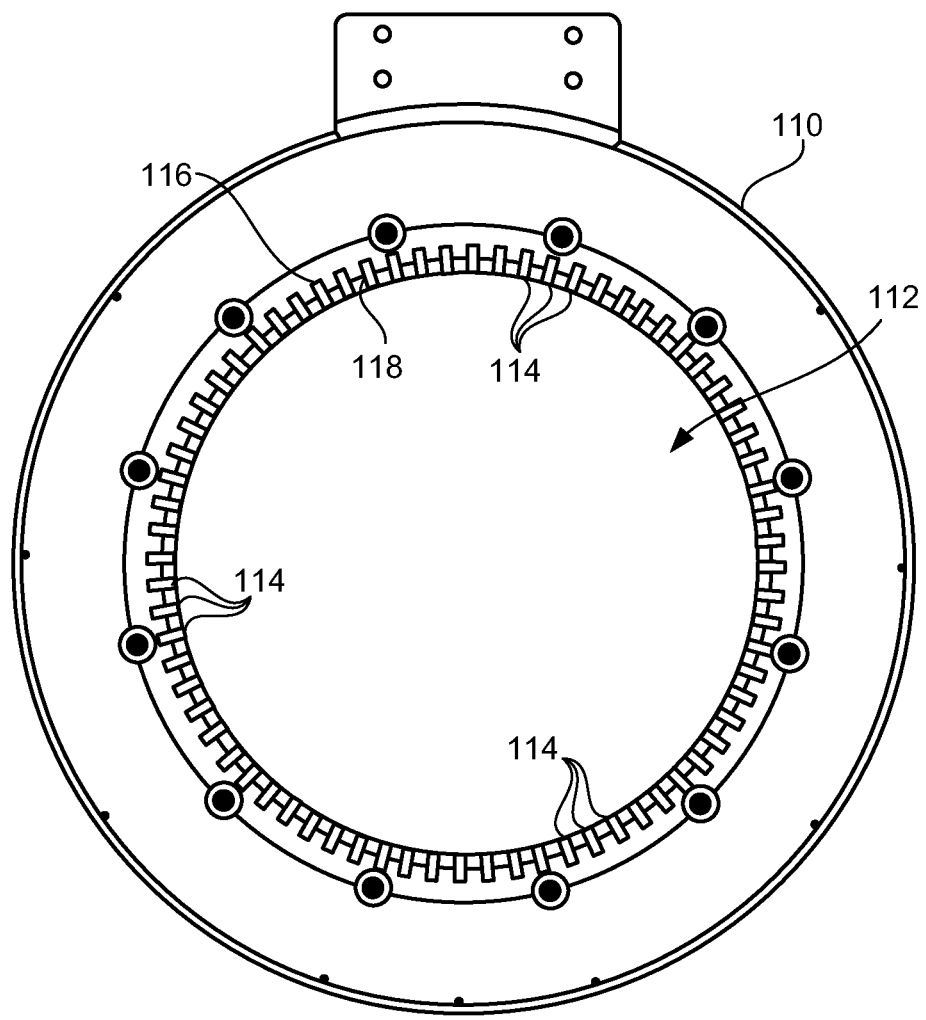
FIG. 4 is an elevation view of a stator plate of an embodiment thereof.
Figure 6:
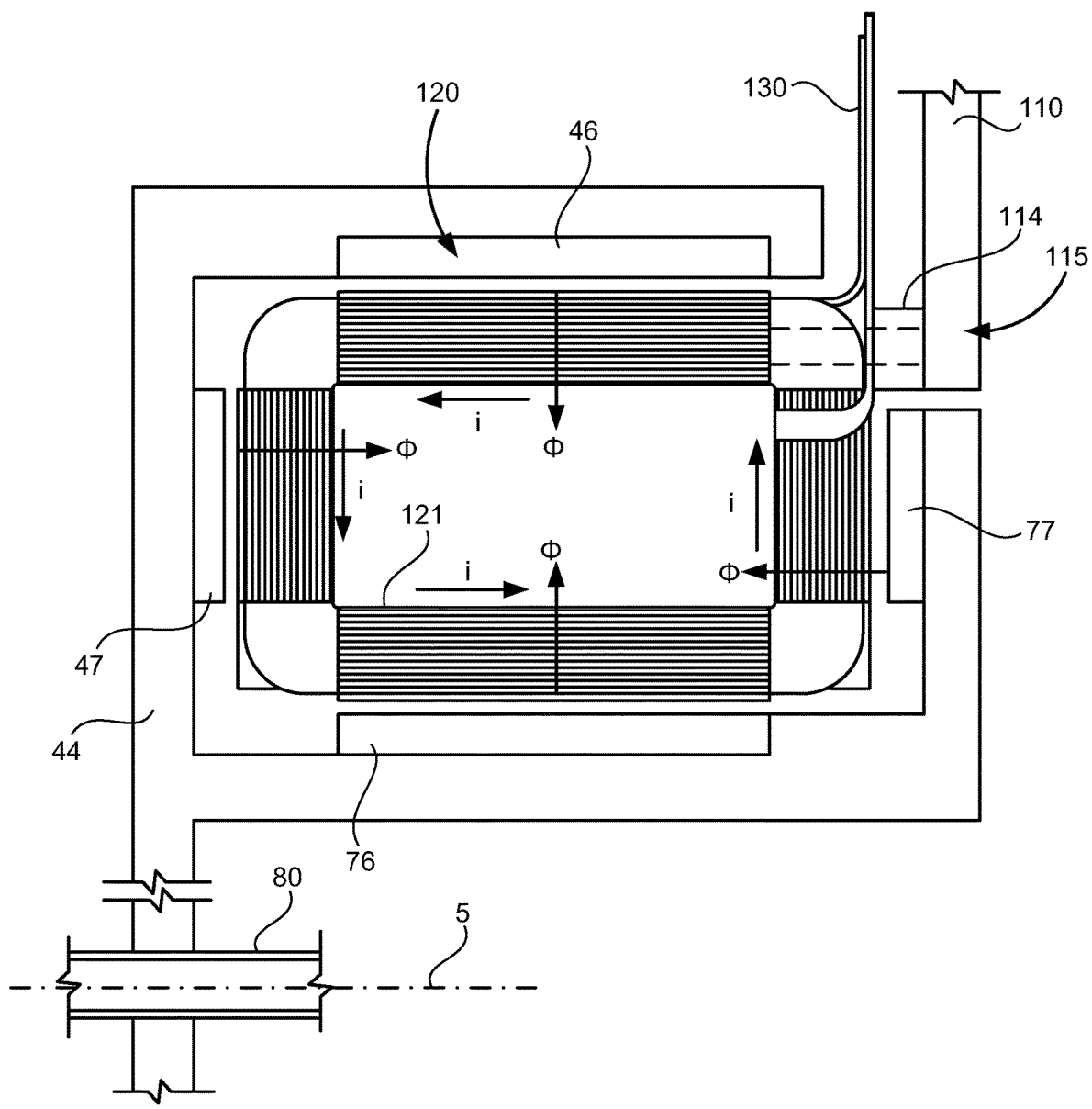
FIGS. 6-8 are exemplary conceptual diagrams of arrangements of said coil assemblies, magnets, supporting frames with axles.
Figure 7:
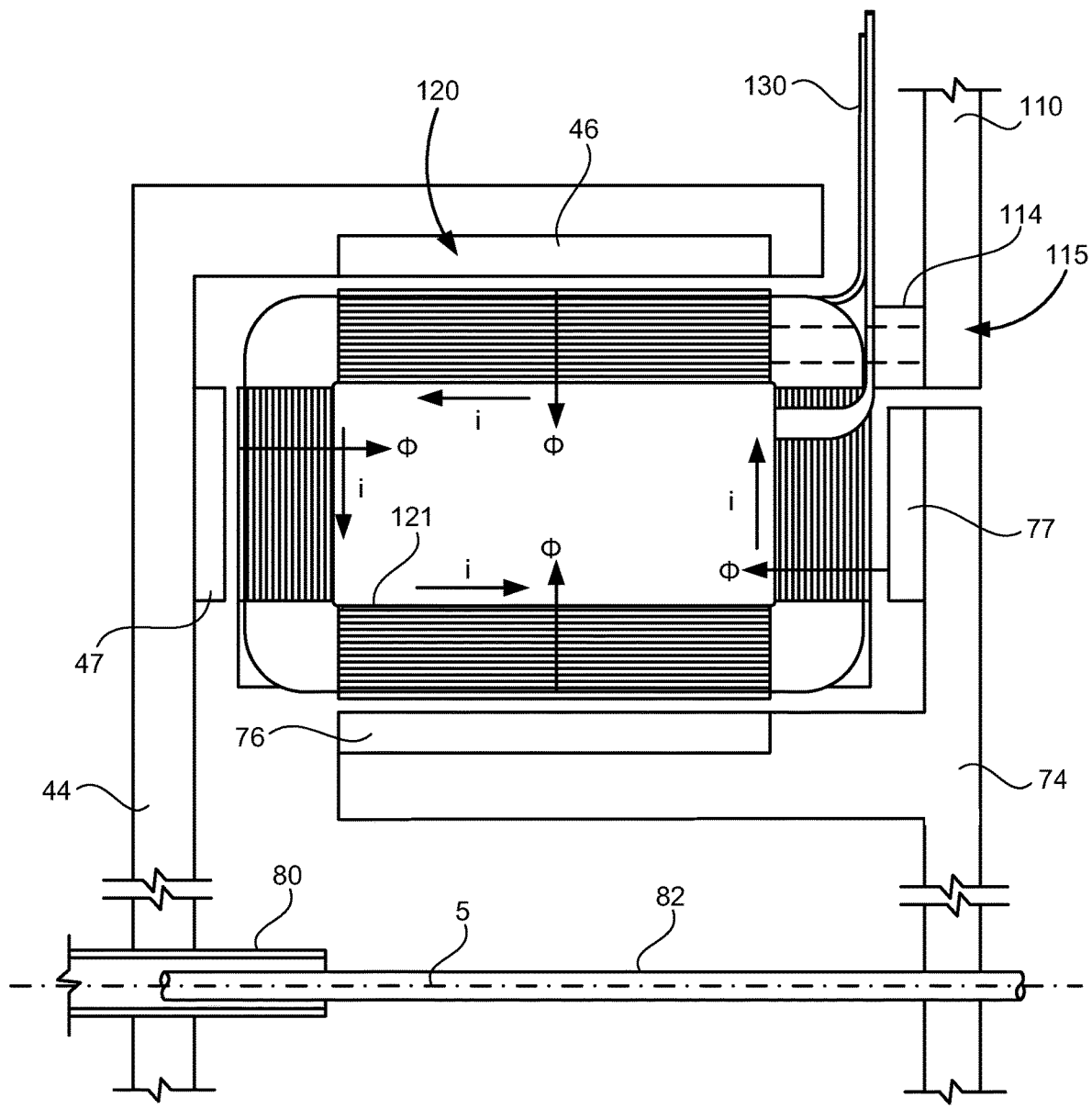
Figure 8:
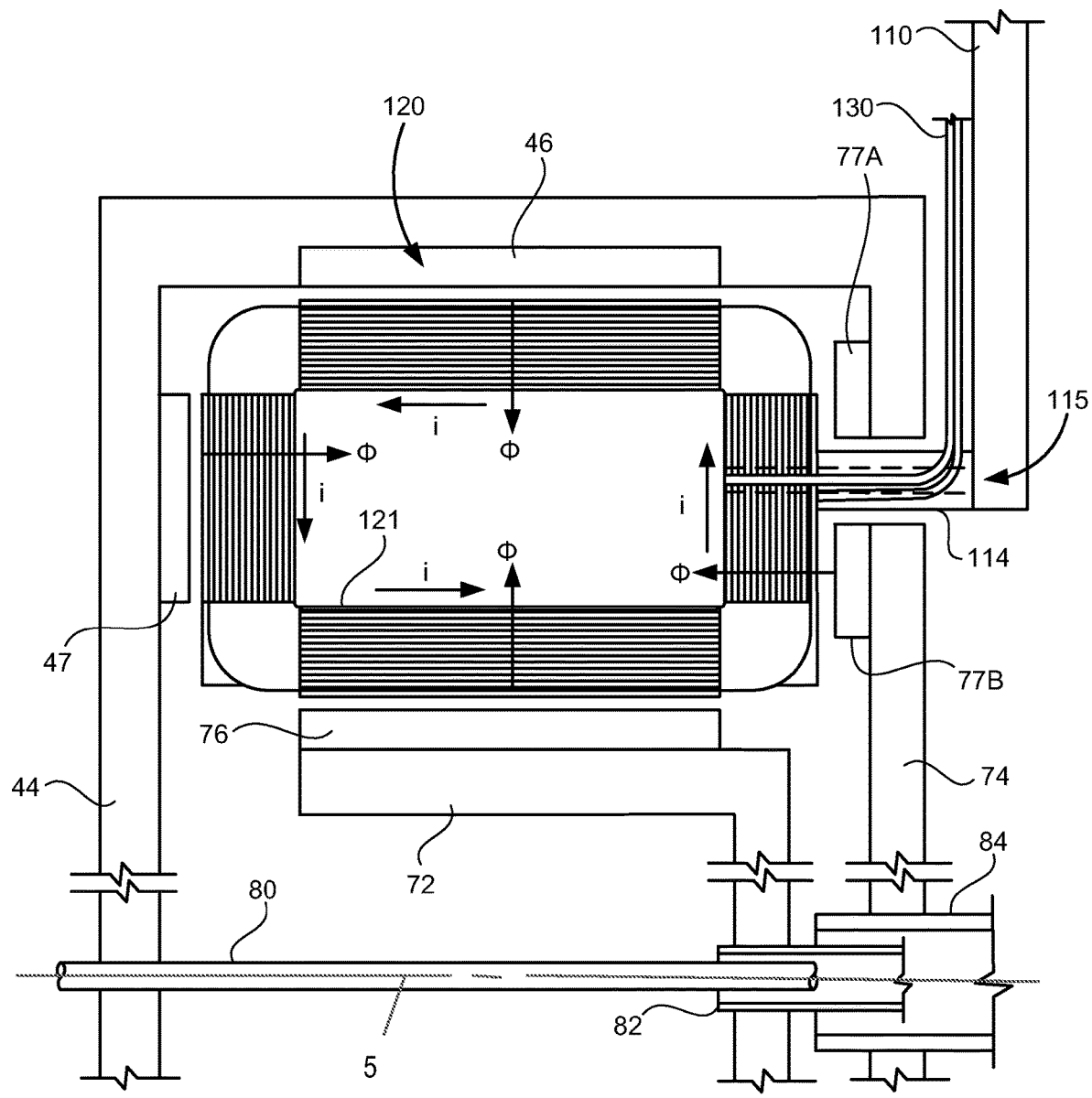

FIG. 4 illustrates circular plate 110 of stator assembly 100 which may have central circular opening 112 large enough in diameter to accept outer flange 74 of assembly 70 (FIG. 2). As shown in FIGS. 6-8, mounting standoffs 114 or similar hardware may be used to secure coil assemblies 120 to plate 110. In FIGS. 6-8, fasteners, shown as hidden lines 115 may be used to secure coil assembly 120 to standoffs 114.

Figure 5:
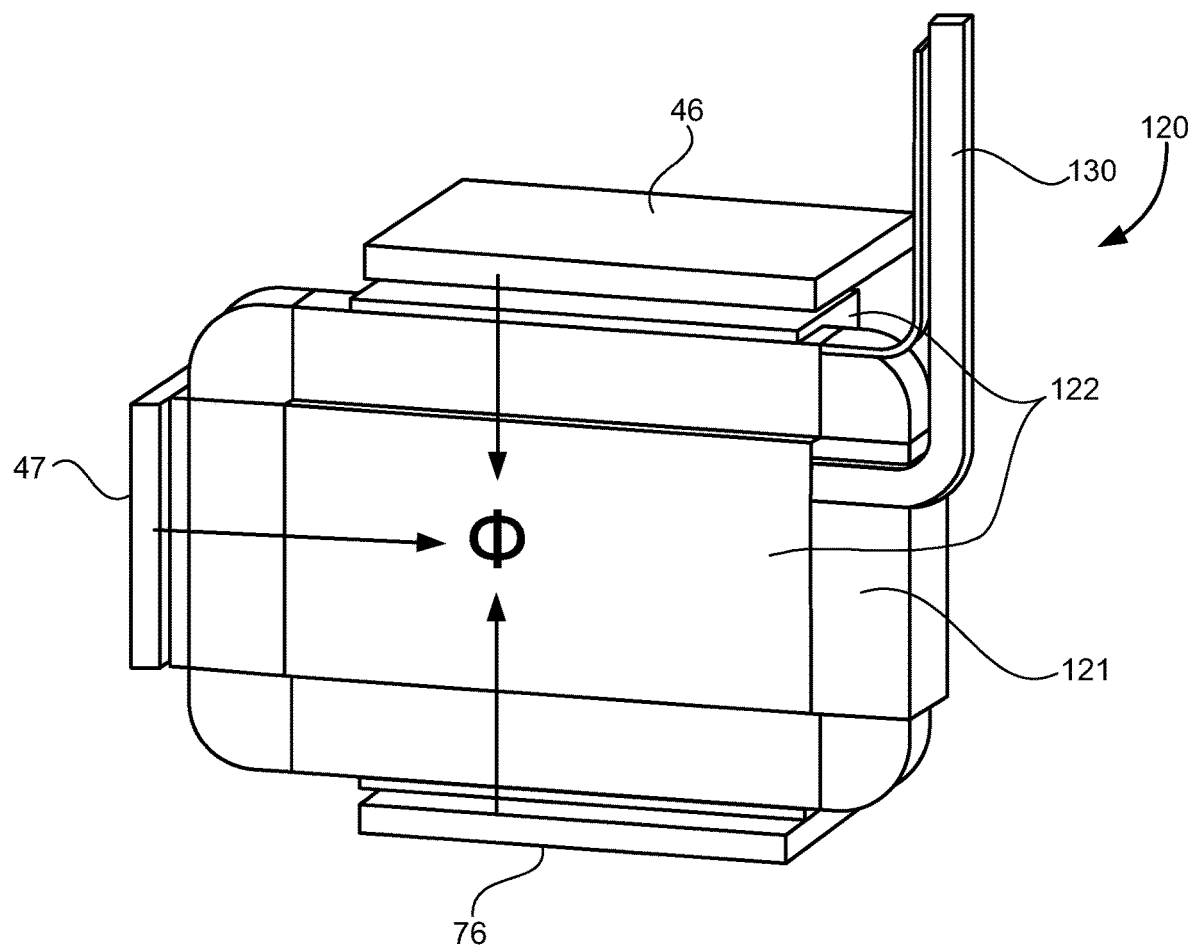
FIG. 5 is a perspective view of an exemplary coil assembly and magnets thereof.

FIG. 5 shows that coil assembly 120 may be rectangular, near rectangular, curvilinear, ovular, or other shapes. Electrical coil 121 may be made of wound flat, round or other shaped electrical conductors such as electrical copper or aluminum strip, and may be placed within core stack 122. Core stack 122 may be of soft iron, laminated silicon steel, insulated iron sheets, carbonyl iron, iron powder, ferrite, vitreous metal or other materials and structures. In embodiments, coil assembly 120 may be ovular, rectangular, circular or other suitable shapes. A full complement of mounted coil assemblies 120 are shown in FIG. 2 secured to standoffs 114. In FIG. 5, magnets 46, 47, and 76 are shown as close coupled to core stack 122. The direction of lines of magnetic flux Φ (the primary or largest component of the magnet flux for each magnet) are shown by arrows. It is noted that in FIG. 5 no magnet is positioned along the right edge of coil assembly 120. It should be realized that magnets 46, 47, 76, (and 77 as shown in FIG. 6) are positioned immediately adjacent to the sides of coil assembly 120 for maximizing magnetic flux linkage and assuring low reluctance. Any or all of magnets 46, 47, 76 or 77 may be permanent magnets or electromagnets, with all magnets directly attached to axles utilizing slip ring or other rotary electrical interfaces as are known in the electromechanical arts. Although the side edges of coil assemblies 120 are shown linear in FIGS. 5-9 these edges may be non-linear and the adjacent surfaces of magnets 46, 47, 76, and 77 may conform so that air gaps between magnets and coil assemblies are minimized. Therefore, coil assemblies 120 may be other than rectangular as those of skill in the electrical arts will appreciate. As shown in referenced applications U.S. 62/028,220, and U.S. 62/028,235 more than three magnets may be arranged so as to be close coupled with coil assemblies 120 during machine rotation.

FIG. 6 shows that a structural frame 44 may extend around four sides of coil assemblies 120 and may secure magnets 46, 47, 76 and 77 in close coupled positions. Structural frame 44 may extend as a continuous circular assembly, or may be arranged as a series of radial spokes arranged over 360 degrees and may comprise one (or more or less) said spoke 44 for each coil assembly 120. Frame 44 may be fixed to axle 80 which is aligned with central axis 5. As axle 80 is rotated, by an external motor for instance, all of the sets of magnets 46, 47, 76, and 77 pass coil assemblies 120 producing a Faraday current. FIG. 6 illustrates a single axle machine 10.

FIG. 7 shows that structural frame 44 may extend around two sides of any one of coil assemblies 120 and may secure magnets 46 and 47 in preferred positions, close coupled to two sides, in turn, of each one of coil assemblies 120 during rotation. As with the arrangement shown in FIG. 6, frames 44 may be secured to axle 80 as shown. A further structural frame 74 may extend around the remaining two sides of coil assemblies 120 and may secure magnets 76 and 77 in place close coupled to coil assemblies 120 and may be secured to axle 82 as shown. Axles 80 and 82 may be coaxially aligned and may be mutually free in rotation. In both motor and generator operation, depending on magnet polarity the axles may rotate in the same or opposite senses. In motor operation the axles will both rotate at the same rpm, while in generator mode the axle may rotate at different rpms as long as electrical phase synchrony is maintained. It is possible for one driven axle to function in generator mode adding a supplementary current to inlet current at input lines 130, while the second axle functions in motor mode driven by the total of input and supplementary currents. FIG. 7 illustrates a dual axle machine 10.

FIG. 8 shows that three structural frames 44, 72, and 74 may secure magnets 46, 47, 72, 77A and 77B. In this arrangement magnet 77 is replaced by two magnets 77A and 77B as shown. Frames 44, 72, and 74 may be secured to coaxial axles 80, 82 and 84 as shown. In both motor and generator operation, depending on magnet polarity the axles may rotate in the same or sense or not. In motor operation the axles will all rotate at the same rpm, while in generator mode the axle may rotate at different rpms as long as electrical phase synchrony is maintained. It is possible for a driven axle to function in generator mode adding a supplementary current to inlet current at input lines 130, while another axle functions in motor mode driven by the total of input and supplementary currents. Of course all axles may be driven by different rotational drivers and may deliver rotational forces to different loads. It should be clear that each magnet 46, 47, and 76 may be replaced by multiple magnets in the manner of magnet 77 being replaced by magnets 77A and 77B. FIG. 8 illustrates a triple axle machine 10.

Figure 9:
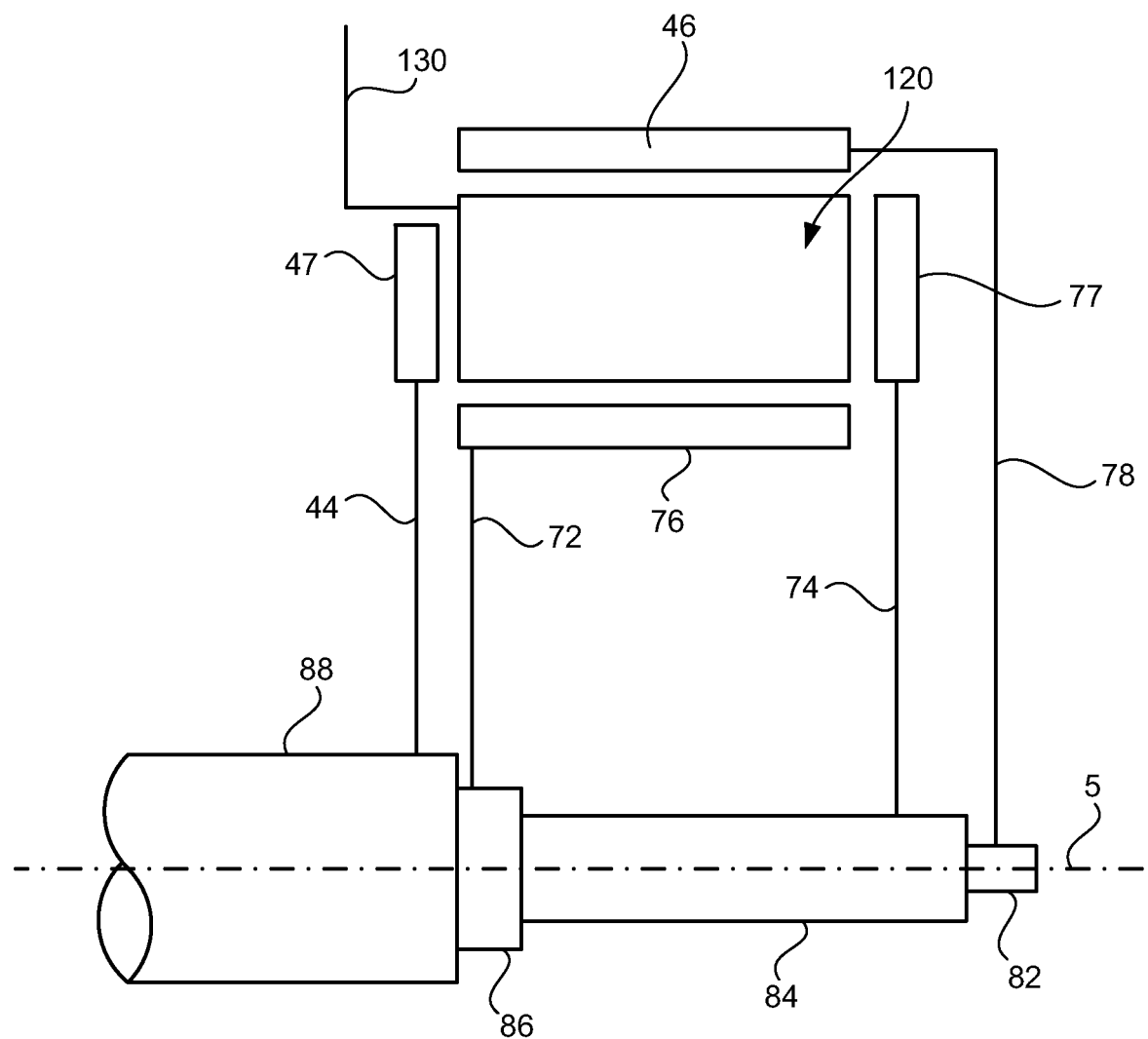
FIG. 9 is an exemplary mechanical schematic diagram of a further arrange s in FIGS. 6-8.

FIG. 9 illustrates a four axle machine, axles 82, 84, 86, and 88, wherein four magnets 46, 47, 76, and 77 may be mounted by frames 44, 72, 74, and 78 to one of the four axles. In like manner if each one of magnets 46, 47, 76, and 77 were to be replaced by two magnets as shown in FIG. 8, all eight magnets can be supported by eight coaxial axles and machine 10 can be used to drive eight separate rotational loads. FIG. 9 illustrates a quad-axle machine 10.

For coaxial integration and operation all said axles except the inner most axle, can be tubular as shown in FIGS. 6-9 and may include toroidal bearings to maintain their mutual coaxial positions and spacing while preserving rotational independents as is known in the mechanical arts. The outermost of the coaxial axles, for instance axle 88 in FIG. 9, may be supported by exterior bearing sets so as to secure all of the axles in their position centered on axis 5 as is also well known.

As shown in FIGS. 6 and 7 the direction of flux, or the primary component (the largest component for each magnet) may be axial or radial. The direction of rotation of machine 10 may be orthogonal to the orientation of flux circuits. Therefore, machine 10 is considered to be a transverse flux machine. It is noted that a normal vector to coil assemblies 120 mounted on the stator of machine 10 defines rotor rotation direction and the magnitude of rpm.

In the foregoing description, embodiments are described as a plurality of individual parts, and this is solely for the sake of illustration. Accordingly, it is contemplated that some additional parts may be added, some parts may be changed or omitted, and the order of the parts may be re-arranged, without leaving the sense and understanding of the apparatus as claimed.

INDUSTRIAL APPLICABILITY

The several embodiments described make such machines desirable in a variety of applications including: propulsion motors for land and sea vehicles, electric and hybrid electric vehicles, underwater vehicles, torpedoes, propulsion motors for electric helicopters and aircraft, elevator propulsion motors, tidal wave generators, wind generators, integrated starter/generators, diesel and natural gas gen-sets, and high frequency low speed machines.

What is claimed is:

1. A method of operating a flux machine at a first frequency and a second frequency, the method comprising:
providing the flux machine, the flux machine including:
a stator;
a plurality of rotors, the plurality of rotors including a first rotor and a second rotor configured to rotate independently about a central axis of the plurality of rotors in a rotary direction;
a plurality of coil assemblies coupled to the stator and;
a plurality of magnet sets coupled to the plurality of rotors, each magnet in each of the plurality of magnet sets being configured to direct magnetic flux in an axial direction or a radial direction, each of the plurality of magnet sets including a first magnet coupled to the first rotor and a second magnet coupled to the second rotor, the first rotor including a first axle configured to rotate about the central axis, the second rotor including a second axle configured to rotate about the central axis, the first magnet of each of the plurality of magnet sets being configured to direct magnet flux in the axial direction toward or away from a respective one of the plurality of coil assemblies, the second magnet of each of the plurality of magnet sets being configured to direct magnetic flux in the radial direction toward or away from the respective one or the plurality of coil assemblies;
driving the first rotor at the first frequency to cause a first current to flow in at least a first one of the plurality of coil assemblies;
driving the second rotor at the second frequency that is different than the first frequency to cause a second current to flow in at least a second one of the plurality of coil assemblies, while maintaining electrical phase synchrony between the first current and the second current.

2. The method of claim 1, wherein the first magnet and the second magnet of each of the plurality of magnet sets are permanent magnets, electromagnets, or a combination of permanent magnets and electromagnets.

3. The method of claim 1, wherein each of the plurality of coil assemblies have side edges and the first magnet and the second magnet of each of the plurality of magnet sets are configured to conform to the side edges of the corresponding one of the plurality of coil assemblies.

4. The method of claim 1, wherein each magnet in each of the plurality of magnet sets directs magnetic flux orthogonal to the rotary direction.

5. The method of claim 1, wherein each of the plurality of coil assemblies are rectangular.

6. The method of claim 1, wherein each of the plurality of coil assemblies are oval in shape and each of the plurality of magnet sets are curvilinear in shape.

7. The method of claim 1, wherein magnetic flux of each of the plurality of magnet sets is configured to be directed perpendicularly to a plane of the first current or the second current flowing in a corresponding coil assembly.

8. The method of claim 1, wherein the first rotor includes a third magnet and a fourth magnet.

9. The method of claim 1, wherein the flux machine further includes a third rotor, and wherein each of the plurality of magnet sets further includes a third magnet and a fourth magnet, the third magnet being coupled to the first rotor and configured to direct magnetic flux toward the corresponding one of the plurality of coil assemblies in an axial direction opposing the magnet flux of the first magnet, the fourth magnet being coupled to the third rotor, such that each of the plurality of coil assemblies on the stator is surrounded by the first magnet, the second magnet, the third magnet, and the fourth magnet of one of the plurality of magnet sets.

10. The method of claim 9, wherein the third rotor includes a third axle, and wherein each of the first axle, the second axle, and the third axle are configured to rotate independently of each of the other axles.

11. The method of claim 9, wherein each of the plurality of coil assemblies includes an electrical coil disposed within channels of a permeable core.

12. The method of claim 1, wherein a gap between one of the plurality of coil assemblies and the first magnet and second magnet of a corresponding one of the plurality of magnet sets is minimized.

13. The method of claim 1, wherein the first axle and the second axle are coaxial.

14. The method of claim 1, wherein the first magnet directs magnetic flux in a first axial direction, and wherein each of the plurality of magnet sets includes a third magnet configured to direct magnetic flux in a second axial direction opposing the first axial direction.

15. The flux machine of claim 14, wherein the second magnet directs magnetic flux in a first radial direction, and wherein each of the plurality of magnet sets includes a fourth magnet configured to direct magnetic flux in a second radial direction opposing the first radial direction.

16. The method of claim 1, wherein the axial direction is generally perpendicular to the radial direction.

17. The method of claim 1, wherein each of the plurality of coil assemblies includes a respective coil and a respective core stack, the respective coil of each of the plurality of coil assemblies being wound at least partially about a first portion of the respective core stack, a second portion of the respective core stack being positioned between a side of the respective coil and a magnet from the first magnet set.

18. The method of claim 1, wherein each rotor of the plurality of rotors includes an axle and a plurality of spokes extending from the axle in a radial direction, and wherein each of the plurality of spokes is coupled to at least (i) the first magnet of at least one of the plurality of magnet sets and (ii) the second magnet of at least one of the plurality of magnet sets.

* * * * *